United States Patent Office 2,731,503
Patented Jan. 17, 1956

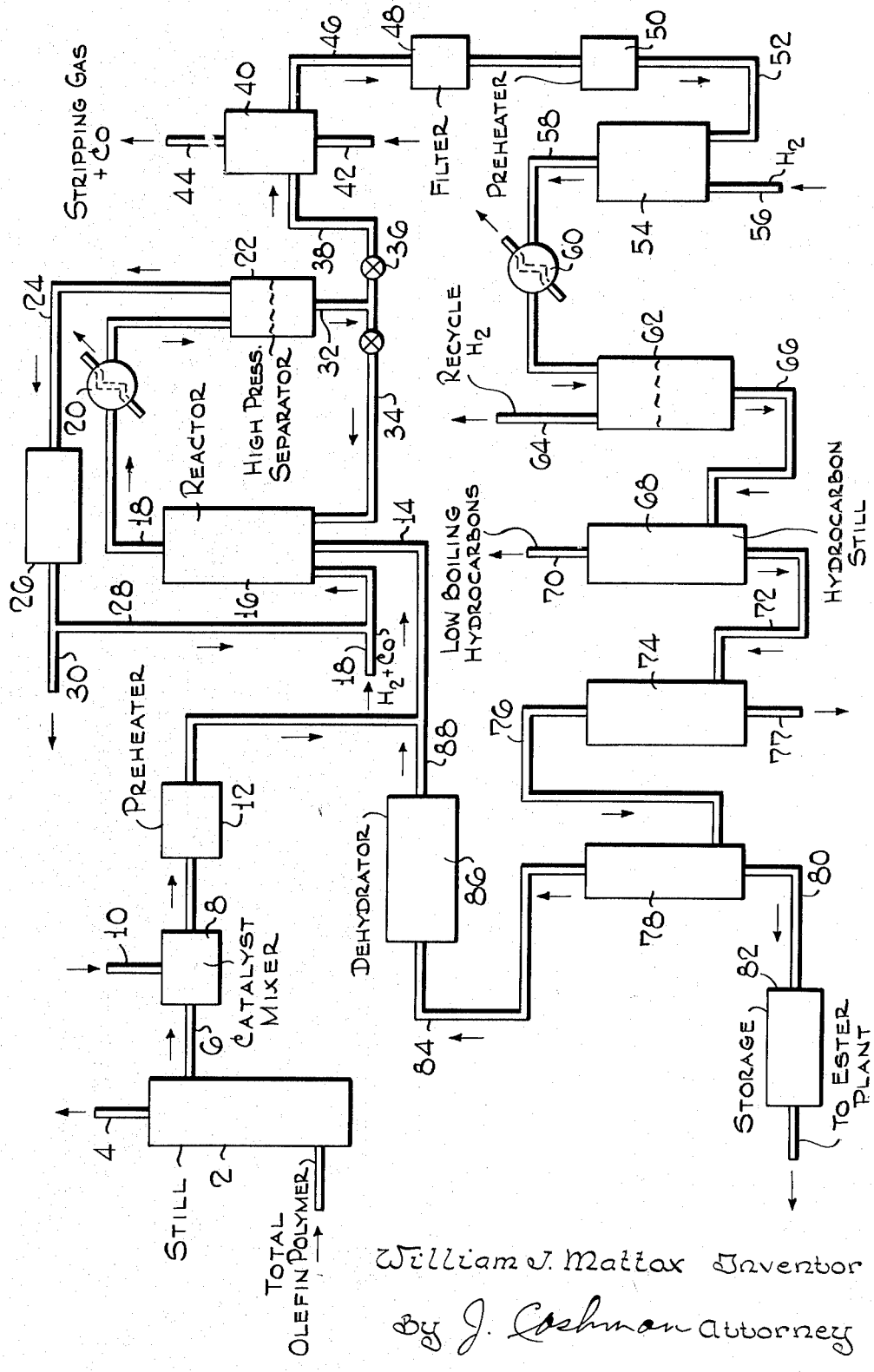

2,731,503
ALCOHOL SYNTHESIS PROCESS

William J. Mattox, Baton Rouge, La., assignor to Esso Research and Engineering Company, a corporation of Delaware Application May 10, 1951, Serial No. 225,548

6 Claims. (Cl. 260—638)

The present invention relates to an improved synthesis process for the production of alcohols by reacting organic compounds having olefinic linkages with gas mixtures containing CO and $H_2$ at high pressures and elevated temperatures in the presence of suitable catalysts. More particularly, the invention is concerned with an improved process for producing alcohols from olefinic feed stocks which normally undergo the carbonylation reaction with difficulty.

The invention further relates to the preparation of narrow boiling alcohols of high quality suitable for use as intermediates for plasticizers from wide cut olefin fractions. Still more specifically the invention relates to the production of octyl alcohols which are particularly suitable as intermediates in the manufacture of plasticizers, from cheap and available raw material.

The synthesis of oxygenated organic compounds from olefinic compounds and mixtures of CO and $H_2$ is now well known in the art. The olefinic starting material is reacted in the liquid state with CO and $H_2$ in the presence of a group VIII metal catalyst, usually cobalt. The primary reaction product consists essentially of organic carbonyl compounds, mainly aldehydes, having one more carbon atom per molecule than the olefinic feed material. The oxygenated product may then be hydrogenated in a second catalytic stage to convert the aldehydes to the corresponding alcohols.

Suggested as starting materials, have been practically all types of organic compounds having an olefinic double bond, including aliphatic olefins and diolefins, cycloolefins, aromatics with olefinic side chains, oxygenated organic compounds with olefinic double bonds, and the like. The metal may be present as a solid or in the form of a compound soluble in the olefinic feed stock. Suitable reaction conditions include temperatures of about 150°–450° F., pressures of 100–300 and higher atmospheres, $H_2$ to CO ratios of about 0.5–2:1, liquid feed rates of about 0.1 to 5.0 v./v./hr. and gas feed rates of about 1000–45,000 standard cubic feet of gas mixture per barrel of liquid olefin feed.

Similar or higher temperatures and pressures, and hydrogenation catalysts such as nickel, copper, tungsten, oxides or sulfides of group VI and group VIII metals, etc. may be employed in the second stage for hydrogenation of the carbonyl compounds to alcohols.

It has, however, been found that certain olefins are considerably less adaptable to the alcohol synthesis process than others, and that, for a given olefin, one isomer may give an aldehyde and an alcohol yield of over 90%, another isomer of the same olefin may give a negligible yield of aldehyde and alcohol. These differences may be attributed to steric effects. Thus straight chain alpha olefins are usually found to give the highest yield of reaction products, whereas tri- and tetra-substituted olefins are highly resistant to reaction, and limit the conversion obtained in the synthesis reaction. This problem becomes particularly acute when the olefinic feed is not a pure compound but a mixture of isomers boiling within a relatively narrow range and consisting of isomeric olefins of the same molecular weight. This is, of course, true in most commercial operations wherein it is not feasible to isolate pure compounds.

For instance, in the process of manufacturing octyl alcohols from heptene on a commercial scale, an abundant source of heptene is available from the controlled polymerization, in the presence of a phosphoric acid catalyst, of a mixture of butylenes and propylene, available in practically unlimited supply in petroleum refineries. The polymer is distilled and the heptene fraction is isolated. As would be expected, the product is a mixture of isomeric heptenes. It is convenient to classify olefinic types in the following manner, depending upon the hydrogen loading of the olefinic carbons.

| Type | | Example |
|---|---|---|
| I | Primary | $R-CH=CH_2$ |
| II | Secondary | $R-CH=CH-R$ |
| III | Tertiary | $\begin{matrix}R\\ \phantom{R}\end{matrix}\!\!\!\!\!\!\!\!\!\!\!C=CH_2 \; /R$ |
| IV | do | $\begin{matrix}R\\ \phantom{R}\end{matrix}\!\!\!\!\!\!\!\!\!\!\!C=CHR \; /R$ |
| V | do | $R_2C=CR_2$ |

An analysis of a typical heptene polymer fraction boiling in the range of about 168° to 210° F., shows an olefin type distribution as follows:

Type: Weight, per cent
I _____ 1
II _____ 12
III _____ 12
IV _____ 55
V _____ 20

It is thus seen that a preponderant fraction of the heptenes is present as tertiary olefins. Now though tertiary olefins of type III are quite reactive in the carbonylation reaction, others, particularly those represented by group V, react very slowly or not at all. For example, 2,3-di-methyl pentene-2 reacts with CO and $H_2$ to form aldehydes at a substantially slower rate than it reacts with $H_2$ alone to form the saturated paraffin. The presence, particularly of the type V type of olefin in the feed to the primary carbonylation reactor puts a large burden on the final distillation section and cuts down materially the plant capacity, for either the olefins are recovered unchanged or as paraffins, both of which are undesired in a process where the primary purpose is to synthesize aldehydes and alcohols, giving as a final result, low overall conversions of olefin.

It is, therefore, the principal purpose of the present invention to utilize more completely the olefin content of a feed to the alcohol synthesis process and to obtain high olefin conversions.

It is also a purpose of the present invention to prepare a feed for the carbonylation reaction containing substantially less type V (tetrasubstituted) olefins from polymers than has hitherto been possible, without resorting to expensive and difficult refractionation methods.

A still further purpose of the present invention is to prepare high yields of alcohols having a given number of carbon atoms from wide olefin cuts.

A further purpose of the present invention is to prepare a superior alcohol more suitable for employment as intermediate in the manufacture of plasticizers and detergents.

Other purposes and advantages of the invention will become apparent hereinafter.

The present invention overcomes the difficulties arising from the use of feeds containing olefinic types IV and V and affords various additional advantages. These advantages, the nature of the invention, and the manner in which it is carried out will be fully understood from the following description thereof read with reference to the accompanying drawing which shows a semi-diagrammatic view of apparatus adapted to carry out the invention.

Primary octyl alcohols are of great economic importance and interest because of their use as intermediates in the manufacture of plasticizers such as those of the di-ester type. For this purpose these alcohols may be esterified with suitable acids such as phthalic, adipic, sebacic, phosphoric, aconitic, and other di- and polybasic acids to yield esters suitable as plasticizers for vinyl resin cellulose acetate, cellulose ethers, cellulose nitrate and also, for synthetic rubbers such as Buna S and the acrylonitrile-diolefin polymers. Plasticizers are used in the compounding of these resinous and rubber materials in order to increase flexibility resistance to brittleness at low temperature and resiliency. Hitherto, these alcohols have been supplied on a commercial scale mainly by such comparatively costly procedures as aldol condensation of butyraldehydes, followed by dehydration, and hydrogenation of the unsaturated octyl aldehyde. It is a purpose of the present invention to disclose a novel and economically attractive process for manufacturing octyl alcohols which are particularly suitable for the manufacture of plasticizers of the di-ester type, such as octyl phthalate.

With the introduction of the carbonylation, or aldehyde synthesis reaction, it was attempted to prepare these octyl alcohols from various $C_7$ fractions commercially available, i. e., that are produced on a scale large enough to provide a steady and available source of feed for the processing of alcohols on a commercial scale to supply a maket of from 30 to 100 million pounds or more of alcohol a year. The olefin fractions readily available are principally those derived and resulting from the processing of petroleum distillates. Thus, available on a large scale are olefin fractions from thermal and catalytic cracking processes, either directly or from polymerization of olefins from these cracking processes. These sources all produce in large supply, olefin fractions containing substantial amounts of heptenes.

One of the most promising sources of supply of heptenes is the olefin polymerization process wherein low molecular weight olefins, such as propylene and butylenes, are polymerized in the presence of a catalyst, such as phosphoric acid on a siliceous carrier, to produce a large variety of olefinic products, boiling in the gasoline range and above. Many refinery light end streams contain appreciable amounts of olefins, and these may readily be converted into polymeric olefins which have considerably greater value as high octane gasoline.

Normally, light ends polymerization plants are operated in refineries to convert a wide variety of lower olefinic materials to polymers suitable for use in gasoline. Ordinary practice is to include propylene, the butylenes and in certain cases, the amylenes, into polymer plant feed stocks. The portion of the resulting polymeric materials boiling in the $C_7$ range is dependent upon the composition of the olefinic feed stock as well as upon the operating variables of the polymerization process, such as temperature, pressure, contact time and the number of stages in the operation. In general, the amount of $C_7$ fraction in the total polymer increases with increase in butylenes in the feed stock and also, with increase in the temperature of operation. It is pictured that $C_7$ hydrocarbons in the polymerization process are derived not only from butylene-propylene copolymerization, but also, from demethylation or disproportionation reactions of higher molecular weight materials such as $C_8$ and $C_9$ polymers. Such disproportionation or demethylation reactions have a certain similarity to cracking and hence, as might be expected, occur with greater frequency as the temperature of the polymerization is increased. There are thus two ways of increasing the yield of $C_7$ olefins in a given polymer plant. These are: (1) increasing the butylene/propylene ratio in the polymer plant feed, and (2) operating at as high a temperature as possible. However, even under the best conditions, the yields of $C_7$ olefins are fairly small compared to other constituents of the total polymer product, and under certain conditions, become limiting in supply when considering large scale alcohol production by the carbonylation or aldhyde synthesis reaction. It is obviously highly desirable to increase the $C_7$ olefin content of the polymeric product to provide cheap sources of this raw material for octyl alcohol production. As indicated above, heptenes from a polymer plant source are converted to octyl alcohols by the carbonylation process and the alcohols esterified to produce plasticizers. The best plasticizer is, generally speaking, the one which bestows a given degree of flexibility, low temperature resistance to brittleness, and resiliency at the lowest plasticizer concentration in the overall compound. This is true largely as a result of economic considerations in that the plasticizer, in general, is more expensive than the resinous or rubber material in which it is incorporated. It is obviously desirable, therefore, to produce by the carbonylation reaction from polymer plant olefins, an alcohol which, on esterification with such acids as phthalic, adipic, sebacic, phosphoric, etc., yields esters of the highest possible efficiencies.

In accordance with the present invention, the overall yield of heptenes for conversion into iso-octyl alcohols, and the resulting alcohol itself, is considerably improved by employing as a feed to the carbonylation reaction the mixed hexene-heptene product resulting from the polymerization of propylene or from the copolymerization of propylene and butylene in the presence of a phosphoric acid-kieselguhr catalyst. As has been pointed out, the heptene fraction of this polymerization product is relatively small; the hexene fraction is also relatively small but may, at low butene content, be equal or greater than the $C_7$. In a typical case employing a propylene-mixed butylene feed, the $C_7$ olefin content of the polymerizate is of the order of about 13.2 vol. percent of the total, whereas the $C_6$ olefin fraction may be about 6.3 vol. percent. The effects of feed composition or product distribution on $C_6/C_6$ olefin ratio are illustrated by the following tabulation.

TABLE I.—POLYMERIZATION OF PROPYLENE

*Effect of butylenes in feed on product distribution*

[400° F., 1000 p. s. i. g., 0.33 gal./hr./lb. feed rate, 40 mol. percent olefins in feed.]

| Mol. percent Butene on Olefin Feed | Volume percent Olefin Cut on Total Polymer | | | | | |
|---|---|---|---|---|---|---|
| | N-Butene | | Iso-Butene | | Mixed Butenes [1] | |
| | $C_6$ | $C_7$ | $C_6$ | $C_7$ | $C_6$ | $C_7$ |
| 0 | 7.0 | 5.5 | 7.0 | 5.5 | 7.0 | 5.5 |
| 5 | 6.5 | 8.3 | 6.5 | 12.0 | 6.5 | 9.5 |
| 10 | 6.3 | 10.7 | 6.0 | 17.0 | 6.3 | 13.2 |
| 15 | 6.0 | 13.0 | 5.8 | 22.0 | 6.0 | 16.7 |
| 20 | 5.5 | 15.0 | 5.5 | 26.5 | 5.7 | 19.7 |
| 40 | 4.7 | 19.5 | 4.6 | 38.0 | 5.0 | 27.3 |
| 60 | 4.0 | 18.5 | 4.0 | 38.0 | 4.3 | 28.3 |

[1] Ratio $N-C_4^=/i-C_4^=$ = approx. 2/1.

In accordance with the invention, the mixed polymer is converted to the corresponding alcohol mixture consisting of iso-heptyl and iso-octyl alcohols, which mixture is readily separated by simple distillation. The recovered heptyl alcohol is then dehydrated to the corresponding heptene, which is then in turn reacted with CO and $H_2$ and a cobalt catalyst to form aldehydes and then alcohols. By this process, not only is the available feed stock for iso-octyl alcohol considerably increased, but the quality of the final product is considerably improved. During the first carbonylation reaction of the mixed feed, the type IV and type V olefins referred to previously, i. e. those containing a high degree of branching, pass through the aldehyde synthesis reaction virtually unreacted and are separated, usually in their hydrogenated form, in the predistillation stage, prior to the separation of the $C_7$ and $C_8$ alcohols. The heptene fraction resulting from the dehydration of the $C_7$ alcohol, however, is, because of its method of preparation, practically free of type IV and type V olefins. As a result, this feed may be treated under considerably more favorable conditions to produce a higher yield of better product than would otherwise be obtainable from a similar amount of $C_7$ olefin obtained in the normal polymerization process. Thus, advantages in product quality would include greater plasticizer efficiencies and improved stress-strain properties (lower modulus). Also, among operative advantages are improved conversion per pass and increased throughput in the carbonylation reactor, coupled with increased carbonylation efficiencies due to the greater proportion of olefins of types I–III in the reactor.

The present invention is of particular advantage in an operation wherein the heptene fraction utilizable for conversion into octyl alcohol is of high quality and contains olefinic constituents particularly adapted to conversion to plasticizing alcohols, but the yield of this fraction is low. Thus, it has been found that the plasticizer efficiencies of esters derived from octyl alcohols produced from polymeric $C_7$ olefins (i. e. heptenes derived from polymerization of low molecular weight olefins of a phosphoric acid catalyst) are not uniform, but depend to a marked extent upon the nature of the olefins employed as feed to the polymer plant. That is, for a given temperature range the heptene fraction when converted into octyl alcohols and then into esters, is found to have different plasticizer efficiencies dependent upon the nature of the olefins employed as feed to the polymer unit. Furthermore, it has been found that the magnitude of the effect of the feed stock composition varies with the temperature of the polymerization. More specifically, it has been found that alcohol products giving esters of superior plasticizer efficiencies are prepared by excluding isobutylene substantially completely from the feed to the polymer plant. Alcohols and esters of highest efficiencies were obtained by using exclusively, propylene or propylene-ethylene mixtures and excluding by suitable removal, all butylenes and higher hydrocarbons from the feed. It was found that though substantially pure propylene or propylene-ethylene mixtures make the most suitable feed in terms of alcohol and ester plasticizing properties, the addition of some butylene was required in order to maintain polymer yields; the total exclusion of butylenes was accompanied by relatively low yields of $C_7$ fraction and it was also found that inclusion of isobutylene to this feed to the polymer plant increased substantially the viscosities and cold temperature brittleness characteristics of the octyl alcohols and esters.

To summarize, therefore, the $C_7$ olefin product of highest quality in terms of suitability of the resulting octyl alcohol for plasticizing purposes is prepared by polymerizing propylene in the substantial absence of butylenes. The yields of $C_7$ fraction are, however, quite low. Somewhat higher yields are obtained by including normal butylenes, though the product is not quite as good. Even higher yields are realized when isobutylene is included in the feed, but in this case the product contains a large amount of type IV and type V olefins, and the octyl alcohol quality is inferior. These results are shown in Tables II and III.

However, by including the hexene fraction from the polymerization process, particularly in the operation wherein butylenes are excluded, and operating in accordance with the invention, a considerably larger feed stock is available for the production of high quality octyl alcohol. Thus, the $C_6$ olefin fraction from a propylene polymerization process over phosphoric acid-diatomaceous earth catalyst amounts to about 7 vol. per cent of the total polymerizate, whereas the $C_7$ fraction amounts only to about 5.5%.

Having set forth its general nature, the invention will best be understood from the following more detailed description in which reference will be made to the accompanying drawing. The description that follows is an embodiment wherein propylene and n-butylenes are polymerized and the $C_6$ and $C_7$ olefin fractions are separated from the polymerizate and employed as feed to the alcohol synthesis process. It is to be understood that the invention is not to be restricted to the employment of this particular feed or to these two components; any mixture of olefins consisting of two olefins differing by one carbon atom may be employed.

Referring now to the figure, the total polymerizate from a $P_2O_5$-diatomaceous earth polymerization unit, wherein a mixture of $C_3$ and $C_4$, preferably normal $C_4$, olefins are polymerized to form a liquid product is passed to distillation zone 2. Light material is taken overhead through line 4. The heart cut, corresponding to the combined hexene and heptene fraction, is withdrawn through line 6. This is the fraction boiling between about 113° and 215° F. at atmospheric pressures, and may have a heptene content of about 13 vol. percent and a hexene content of about 6.5 vol. percent. The olefin is passed to mixer 8 wherein cobalt oleate or other suitable catalyst is added through line 10 in such proportions that the weight of cobalt in solution is about 0.15–0.3% of the total liquid.

The mixture is then pumped to preheater 12 wherein it is brought to the desired temperature range and then discharged via line 14 to the bottom of primary carbonylation reactor 16. Reactor 16 comprises a high presure reactor vessel which may, if desired, be packed with non-catalytic material such as ceramic rings, porcelain or quartz chips, pumice and the like. It may also be divided into discrete packed zones separated by any suitable means, such as support grids, etc. or it may comprise but a single packed zone, or it may contain no packing.

A stream of synthesis gas comprising $H_2$ and CO in the approximate ratio of 0.5–2 volumes $H_2$/CO, preferably 1.0–1.2 to 1, is fed into reactor 16 through line 18. The synthesis gas stream is a composite of fresh gas and recycle, and flows upwardly with the olefin feed through reactor 16. The latter is preferably operated at a pressure of about 2500–3500 p. s. i. g. and at a carefully controlled temperature range of 300°–360° F., preferably between 340°–360° F. The rate of flow of synthesis gases and of olefin through reactor 16 is so regulated that the desired conversion level of olefin is obtained. These conditions include an olefin fresh feed rate of about 0.4–1.0 v./v./hr., fresh synthesis gas feed rates of 1000–10,000 cu. ft./barrel of olefin, and a nominal residence time of about 1–3 hours.

The carbonylation reaction may be carried out substantially adiabatically, that is, no external cooling means such as tubes or coils need be provided, but cooling and temperature control of the highly exothermic reaction is carried out by recycle of a portion of the product, as described below. Liquid oxygenated reaction products containing catalyst in solution, as well as unreacted synthesis gases are withdrawn from an upper portion of high pressure reactor 16 and transferred through line 18 and cooler 20 to high pressure separator 22 where unreacted gases are withdrawn overhead through line 24, scrubbed in scrubber 26 of entrained liquid, and preferably recycled to reactor 16 via lines 28 and 18. A portion of the recycle may be purged through line 30 to maintain the desired $H_2/CO$ ratio in the feed.

Liquid carbonylation product containing dissolved therein relatively high concentrations of cobalt carbonyl is withdrawn from separator 22 via line 32. A portion of this stream may be recycled to reactor 16 via line 34 to aid in the cooling and maintenance of temperature control of the primary carbonylation stage. Preferably recycle liquid product is injected at various levels within reactor 16 to obtain close temperature control throughout the whole reactor. Approximately 400–500 volume percent of liquid reaction product on the fresh olefin feed may be recycled for this purpose. The temperature of such recycled material is generally dependent on that of the atmosphere, and may be about 30°–100° F.

The balance of the primary reaction product not recycled to reactor 16, which may comprise, beside desired heptyl and octyl aldehydes, also unreacted olefins of the highly branched type, secondary reaction products, and dissolved cobalt carbonyls, is withdrawn through pressure release valve 36 and line 38 and passed to decobalting zone 40. Within decobalter 40, soluble cobalt carbonyl is removed from the aldehyde product prior to high pressure hydrogenation in order to prevent its decomposition in the subsequent hydrogenation stage with consequent fouling of coils and reactor plugging. The decomposition of the cobalt carbonyl is obtained by heating the aldehyde product by such means as steam coils, etc. to about 200°–400° F. at a pressure just high enough to keep the components in the liquid phase. Pressures in the neighborhood of 100–150 p. s. i. g. are preferred. The product containing catalyst in solution is injected into decobalter 40 through line 38 and stripping gas such as $H_2$ or steam may be added through line 42 to aid in decreasing the CO partial pressure and decomposing the cobalt carbonyl. If desired, it may be advantageous to operate with two or more decobalters, switching the stream from one to the other as the one in service accumulates excessive quantities of cobalt metal. The gas stream comprising stripping gas and CO may be removed overhead from 40 through line 44 and used as desired.

The liquid aldehyde product now substantially free of dissolved catalyst is withdrawn from 40 through line 46 and passed through filter 48 for removal of any suspended cobalt. The filtered solution is withdrawn from 48 and passed through preheater 50 to the bottom portion of hydrogenation reactor 54 via line 52. Simultaneously hydrogen is supplied to 54 through line 56 in proportions sufficient to convert the aldehydic product into the respective alcohols. Hydrogenator 54 may contain a mass of any conventional hydrogenation catalyst, such as nickel, copper chromite, sulfactive catalyst such as tungsten, nickel or molybdenum sulfide, preferably supported on carriers such as pumice, charcoal, etc. Reactor 54 is preferably operated at temperatures of about 400°–500° F. and pressures of about 2500–3500 p. s. i. g.

The products from the hydrogenation reactor and unreacted hydrogen may be withdrawn overhead through line 58, passed through cooler 60 and high pressure separator 62, whence $H_2$ is removed overhead through 64 for recycle. The liquid product is withdrawn from separator 62 through line 66 and, after passing through conventional low pressure separators and stabilizers (not shown), is passed to hydrocarbon still 68, wherein are distilled overhead low boiling products, mostly hydrocarbons boiling below 220° F. These materials are removed through 70 as a heads cut and may be used as gasoline blending agents. The bottoms from this primary distillation are withdrawn from hydrocarbon still 68 via line 72 and sent to alcohol still 74 where a combined heptyl and octyl alcohol cut boiling within the range of 270° to 380° F. at atmospheric pressure is taken.

The combined alcohol stream is then passed through overhead line 76 to fractionating column 78; distillation bottoms boiling above octyl alcohol may be withdrawn through line 77 and be used in any desired manner, as cracking stock, fuel, etc., or they may be further processed and distilled at subatmospheric pressures to recover valuable oxygenated organic products.

Fractionating column 78 is operated at carefully controlled conditions to effect a sharp separation between heptyl and octyl alcohols. Conditions within 78 include temperatures of 345° to 360° F. The octyl alcohol fraction is withdrawn downwardly through line 80 and sent to storage tank 82, from whence the product may be sent to an esterification plant for conversion into a di-octyl ester, such as di-octyl phthalate, in a manner known per se.

Returning now to fractionating column 78, the overhead product, consisting largely of a mixture of normal heptyl alcohols, is withdrawn through line 84 and passed to dehydration zone 86. A suitable dehydration catalyst is, for example, active alumina; other materials, such as phosphoric acid, thoria, blue tungsten oxide, anhydrous aluminum sulfate, and the like, may also be used. Dehydration zone 86 is operated under conditions such that polymerization of the olefin is substantially avoided.

The dehydration of the alcohol is carried out in vapor phase in the presence of a fixed bed of catalyst such as an active alumina, preferably a partially dehydrated alumina or one that has not been heated appreciably above the dehydrating temperature of about 500–800° F. Atmospheric pressure is preferred for the aliphatic alcohols since the reaction is somewhat more selective to the olefin. Feed rates of the order of 1 to 5 volumes or more of alcohol per volume of catalyst per hour are suitable depending upon the exact temperature employed and the conversion desired. Dehydration under these conditions does not result in more highly branched olefins but may actually decrease branching under certain conditions. Since conversions of alcohol to olefin in excess of about 90 mol. percent may readily be obtained in this operation, it will not ordinarily be necessary to separate the small remaining amount of alcohol from the olefin returned to reactor 16. Water resulting from the dehydration is removed.

The olefinic product resulting from the dehydration of the heptyl alcohols, and consisting primarily of olefins of types I, II, and III, is withdrawn from dehydration zone 86 and recycled to aldehyde synthesis reactor 16 via lines 88 and 14 for further conversion into octyl alcohols in a manner already described.

By the process of the present invention, not only is the resulting alcohol of higher quality, but also wide range boiling feeds may be employed, eliminating costly preparation of feeds specific to the desired alcohol. Also, olefin feeds that are highly desirable for use as intermediates in the manufacture of plasticizing agents, such as pure polypropylene, but which are present in only small amounts, may now be utilized as a result of the application of the present invention, for plasticizer properties become less desirable at polymerization conditions under which the $C_7$ yield in the total polymer increases.

The relationship between yields of polymer and the suitability thereof as feed to the alcohol synthesis process for conversion into plasticizing alcohols, is clearly shown in the tables below. In Table II are shown the yields of $C_7$ olefin, the viscosities of the corresponding octyl alcohols, and the plasticizing efficiencies of the di-octyl phthalates when the polymerization unit is operated at relatively high temperatures of 450°–500° F., and Table III shows the results at low temperature (380°–425° F.) polymerization conditions.

TABLE II

*Effect of butene content of polymer plant feed on plasticizer efficiency of di-octyl phthalates under high temperature polymerization conditions*

| Feed to Polymer Plant, Mol Percent Total Olefin | | | Alcohol Viscosity, Centistokes @ 68° F. | Modulus at 50% Elongation (30° F.), p. s. i. | Polymerization Temp., ° F. | Vol. Percent $C_7$ in Total Polymer |
|---|---|---|---|---|---|---|
| Propylene | n-butenes | i-butenes | | | | |
| 100 | 0 | 0 | 12.1 | 2,145 [1] | 451 | 5.3 |
| 90 | 10 | 0 | 12.3 | 2,115 | 450 | 10.5 |
| 80 | 20 | 0 | 12.5 | 2,170 | 496 | 18.5 |
| 80 | 20 | 0 | 12.6 | -------- | 446 | 14.0 |
| 90 | 0 | 10 | 12.4 | 2,240 | 450 | 14.4 |
| 80 | 0 | 20 | 12.7 | 2,350 | 446 | 24.8 |
| 98 | 1 | 1 | 12.6 | 2,225 | 449 | 6.4 |
| 90 | 6 | 4 | 12.6 | 2,110 | 452 | 11.5 |
| 45 | 37 | 18 | 12.8 | -------- | 450 | 28.9 |

In the above tests the vinyl resin compound contained 32.7% (wt.) plasticizer.
[1] Plasticizer concentrations 31.6 wt. percent; when corrected to 32.7%, value of about 2,020 p. s. i. indicated.

TABLE III

*Effect of butene content of polymer plant feed on plasticizer efficiency of $C_8$ phthalates under low temperature polymerization conditions*

| Feed to Polymerization, Mol Percent on Total Olefins | | | Alcohol Visc., Cs. @ 68° F. | Modulus @ 50% Elongation (30° F.) | Polymerization Temp., ° F. | Vol. Percent $C_7$ in Total Polymer |
|---|---|---|---|---|---|---|
| Propylene | n-butenes | i-butenes | | | | |
| 97.6 | 1.6 | 0.8 | -------- | -------- | 421 | 6.5 |
| 86.9 | 8.7 | 4.4 | 12.75 | 2,240 | 422 | 10.5 |
| 72.8 | 18.1 | 9.1 | -------- | -------- | 426 | 15.5 |
| 89.4 | 10.6 | 0 | | | | 6.7 |
| 90.2 | 9.8 | 0 | 12.6 | 2,140 | 405–410 | 7.7 |
| 89.3 | 10.7 | 0 | | | | 9.1 |
| 87.4 | 8.4 | 4.2 | -------- | -------- | 404 | 8.5 |
| 45.0 | (ca.) 37 | (ca.) 18 | 13.4 | 2,255 | (ca.) 380 | -------- |
| 90.0 | 6.7 | 3.3 | 12.9 | 2,240 | (ca.) 400 | -------- |

The determination of the tensile, or stress-strain (modulus) properties of the plasticized vinyl blends were carried out by the standard method of extending dumb-bell shaped specimens at 30° F. and recording the stress value at 50% elongation and break point as well as percent extension at the point of rupture.

The above tables and results show the following:

1. The lowest modulus, that is, the most desirable stress/strain properties, were shown by di-isooctyl phthalates obtained from $C_7$ olefins produced by maintaining the feed to the polymerization plant substantially free of butylenes and feeding substantially only propylene. However, the yield of $C_7$ olefins on the total polymer was low.

2. For a given quantity of butylenes in the feed to the polymer plant, at a given polymerization temperature level, normal butylenes yield phthalic esters of lower modulus than isobutylenes.

3. The lower viscosities of the propylene and the propylene-n-butylene copolymer-derived alcohols appear to be associated with the superior stress/strain characteristics of the corresponding esters, and for a given amount of butenes in the feed, alcohols derived from propylene-isobutylene copolymers have higher viscosities than those derived from propylene-n-butylene copolymers.

4. Plasticizer properties become less desirable at polymerization conditions under which $C_7$ yield in the total polymer increases.

It is thus apparent that by employing as the feed to the alcohol synthesis reaction the polymerizate resulting from using pure propylene, or propylene admixed with only slight amounts of n-butylenes, and by employing the $C_6$–$C_7$ olefin fraction rather than the $C_7$ fraction, the ultimate yield of high quality $C_8$ alcohol is considerably raised, and the process made economically feasible.

The following table shows the estimated yields of octyl alcohol, based on the total polymerizate, obtained when (1) only the heptene fraction and (2) the mixed hexene-heptene fraction resulting from (a) polymerization of pure propylene and (b) polymerization of a typical propylene-butylene fraction is employed in the alcohol synthesis reaction. The comparatively large yields of iso-octyl alcohol obtainable by operating in accordance with the present invention are evident.

| Oxonation Feed | Vols. Iso-Octyl Alcohol/100 Vols. Total Polymer | |
|---|---|---|
| | (a) $C_3H_6$ Polymer | (b) $C_3H_6$ + $C_4H_8$ Polymer [1] |
| (1) $C_7$ only | 3.6 | 8.6 |
| (2) $C_6$+$C_7$ | 11.0 | 15.2 |

[1] 10% mixed butenes in $C_3H_6$; ratio N–$C_4^=$/i–$C_4^=$ = approx. 2/1.

The embodiment of the invention as illustrated in the drawing and foregoing description admits of modifications readily apparent to those skilled in the art, and are within the scope of the invention. Thus, though in the preceding, reference is had specifically to a $C_6$–$C_7$ olefin fraction, the same selective removal of olefin types from wide cut olefinic feeds will be found in the preparation of other specific alcohols.

What is claimed is:

1. An improved process for producing octyl alcohols of high quality in increased yields which comprises passing an olefin mixture consisting essentially of hexene and heptene produced by the polymerization of a light gaseous hydrocarbon feed comprising at least a major proportion of propylene and substantially free of isobutylene, into a carbonylation zone, treating said hexene-heptene mixture with CO and $H_2$ under elevated temperatures and pressures with a cobalt carbonylation catalyst, whereby heptyl and octyl aldehydes are obtained, reducing said aldehydes to the corresponding alcohols, separating heptyl from octyl alcohols, converting heptyl alcohols to heptenes, said heptenes having olefinic unsaturation substantially on terminal carbon atoms, passing said heptenes to said carbonylation zone, and recovering increased amounts of high quality octyl alcohols.

2. The process of claim 1 wherein said light gaseous hydrocarbons consist essentially of propylene.

3. The process of claim 1 wherein said light gaseous hydrocarbons polymerized to form said hexene and heptene mixture comprise a major proportion of propylene and a minor proportion of normal butylenes.

4. The process of claim 1 wherein said carbonylation conditions comprise pressures of about 2000 to 3500 p. s. i. g. and temperatures of about 250° to 375° F.

5. An improved process for preparing octyl alcohols from an olefin feed stock containing substantial amounts of unreactive tetra-substituted tertiary olefins as well as less highly substituted olefins which comprises segregating the olefin fraction boiling between about 113° and 215° F., passing said fraction to an aldehyde synthesis zone wherein an aldehyde product is formed, hydrogenating said aldehyde product to form an alcohol product boiling in the range of about 270°–380° F., separating a heptyl and an octyl alcohol fraction, dehydrating said heptyl alcohol fraction to form a heptene fraction substantially free of tetra-substituted tertiary olefins, said heptene fraction having olefin unsaturation substantially on terminal carbon atoms, converting said last-named olefins to an octyl alcohol product, and combining said first-named and said last-named octyl alcohol product.

6. An improved process for preparing octyl alcohols of high quality from an olefin mixture consisting essentially of hexenes and heptenes, said feed being further characterized in that a substantial portion of said olefins are tri-substituted and tetra-substituted, which comprises passing said mixture to a carbonylation zone, reacting said mixture with CO, $H_2$ and a cobalt carbonylation catalyst at elevated temperatures and pressures to form a reaction product comprising substantial amounts of heptyl and octyl aldehydes produced from non-tetra-substituted olefins, hydrogenating said aldehydes to the corresponding primary alcohols, separating heptyl alcohols from octyl alcohols, converting heptyl alcohols to heptenes wherein olefinic unsaturation is substantially on terminal carbon atoms, passing said heptenes to said carbonylation zone for further conversion to octyl aldehydes and alcohols and recovering increased yields of iso-octyl alcohol product of superior plasticizing properties.

References Cited in the file of this patent

UNITED STATES PATENTS

| | | |
|---|---|---|
| 2,403,524 | Hagemann | July 9, 1946 |
| 2,415,102 | Landgraf | Feb. 4, 1947 |
| 2,464,916 | Adams et al. | Mar. 22, 1949 |
| 2,470,171 | Kennedy et al. | May 17, 1949 |
| 2,530,989 | Parker | Nov. 21, 1950 |
| 2,549,111 | Millendorf et al. | Apr. 17, 1951 |